Patented Apr. 16, 1946

2,398,350

UNITED STATES PATENT OFFICE 2,398,350

METHOD OF PRODUCING ELASTIC POLYMER

Francis Clarke Atwood, Newton, and Henry A. Hill, Cambridge, Mass., assignors, by mesne assignments, to National Dairy Products Corporation, New York, N. Y., a corporation of Delaware No Drawing. Application August 14, 1942, Serial No. 454,864

2 Claims. (Cl. 260—83)

This invention relates to polymers having elastic properties similar in some respects to those of natural rubber. More particularly, the invention relates to polymers in which the essential polymerizing monomer is an alkyl acrylate, and which are formed so that at an intermediate stage of their manufacture, they have plastic flow properties suiting them for molding, following which the plastic flow characteristic may be eliminated and the elastic characteristics enhanced.

Rubber in its natural form is elastic but possesses a certain amount of plastic flow properties as well as elasticity. These plastic flow properties can be enhanced by milling the crude rubber. In order to better appreciate and understand the invention, it is desirable to restate the simple rubber chemistry. Natural rubber is thought to consist of long chain molecules which contain unsaturated or double bonds, and the ability of rubber in this condition to flow has been explained on the basis of the long chain molecules slipping past one another. The molecular structure of natural or milled rubber is not such as to cause the chains to return to their original positions relative to each other. This makes it possible to mold the rubber and make it take any desired form.

In order to eliminate this plastic flow, it is the practice to mill sulfur into the rubber during the milling operation. After or during molding of the rubber, the rubber-sulfur mixture is heated and the plastic flow is eliminated. This is termed "vulcanization" and it is thought that sulfur reacts with the unsaturated bonds in the long chain molecules of the rubber to effect cross linkages between the chains. These cross linkages are assumed to prevent slippage of the chains past each other and eliminate plastic flow. At the same time the elasticity is preserved or enhanced. The latter may be regarded as due to the elastic characteristic of the chains themselves and to the cross links.

It is the standard practice in the rubber industry to process the rubber through an intermediate stage in which it possesses plastic flow to permit molding, following which the plastic flow properties are eliminated by reaction with sulfur in the process known as vulcanization. It is absolutely necessary that the final product be free from plastic flow or have a minimum of it. On the other hand it is desirable at some stage to have this plastic flow to permit molding.

The techniques in the rubber industry have been well developed and standardized because of these well known properties of natural rubber and its simple reaction with sulfur. In producing an elastic composition, a so-called "synthetic rubber," which may not be the same as natural rubber chemically, it is very desirable that such a product be capable of passing through this two stage process so as to permit molding while the product has plastic flow characteristics, following which the plastic flow is eliminated. It is particularly desirable that the plastic flow may be eliminated by a simple method after molding, and preferably by the use of heat and mechanical operations similar to vulcanization so that the composition may be processed by the well established rubber technique and by workmen already skilled in that technique.

It is an object of the invention to produce materials which, while quite different chemically from natural and vulcanized rubber, are adapted to be processed in accordance with established rubber processing procedures, and which upon completion of processing, have, among other things, a number of properties similar to those of vulcanized natural rubber.

It is a further object of the invention to eliminate the plastic flow from alkyl acrylate polymers by trans-esterification, ester interchange, saponification or other reaction using the alkyl group of the polymer, and without the use of vulcanization.

It has long been known heretofore that compounds containing ethylene linkages, such as ethylene, acrylic acid, and the alkyl acrylates, may be polymerized into long chain polymers. These polymers possess some elasticity, but all of them possess plastic flow properties. The elasticity, particularly in the case of the alkyl acrylates possibly may be attributed to the alkyl radical extending as side groups from the long chain polymers. However, these side groups do not prevent plastic flow.

It is important to note that these polymers which contain plastic flow properties, and which properties may be enhanced by a milling operation similar to that performed on natural rubber, are all saturated. Thus the long chain molecules of the polymers do not contain any unsaturated or double bonds, and it is not possible to cross link the chains of the polymers by a reaction with sulfur, as is common in the rubber industry.

It may be possible to co-polymerize the alkyl acrylates with other unsaturated compounds which offer a possibility of cross linking the co-polymers. But the establishment of cross linkages between homogeneous saturated polymers, or by the use of the radicals contained in these homogeneous polymers, whereby plastic flow may be eliminated, has not been perceived as a possibility by the prior art, nor has it been accomplished by any method as far as is known.

In accordance with this invention, rather than attempt the difficult procedure of introducing double bonds into or adding double bonds onto the long chain polymers to permit conventional vulcanization with sulfur, or to form co-polymers having groups through which cross linkage may be effected, it has been discovered that it is possible to cross link the chains of the polymer by using the alkyl groups that are available in a homogeneous alkyl acrylate polymer, such as by trans-esterification, ester interchange, or saponification. In general, any di-type compound may be used which contains two groups reactive with the alkyl groups, such as polyhydroxy compounds, for example, the dihydric alcohols $(HO(CH_2)_xOH)$ where $x$ is an integer as typified by ethylene glycol; the trihydric alcohols as typified by glycerol; esters of hydroxy acids such as poly-ricinoleate and lactate esters of polybasic alcohols, citrates; simple di-esters such as glycol di-chloride or di-acetate; and hydroxides of bivalent metals such as hydrated lime.

In accordance with a preferred embodiment of my invention, which is described merely as illustrative, an alkyl acrylate, such as the methyl, ethyl, propyl, butyl or lauryl acrylates, or a mixture thereof, and preferably one of the lower alkyl acrylates, is polymerized in accordance with techniques well understood in the art and which need not be described in detail here. If it is desired, however, a preferred form of the polymerization using an excess of the monomers may be utilized.

The alkyl acrylate monomers, when so polymerized, result in simple polymers having long chains, a section of which may be illustrated by the following formula:

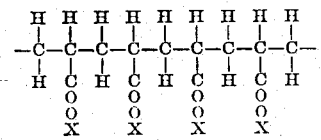

in which X is the alkyl group. It is readily apparent that such polymers are saturated.

When the monomer is solely methyl acrylate a section of the long chain has the following formula:

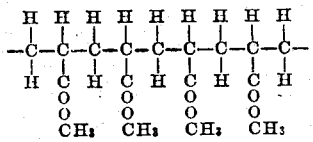

The polymers of the alkyl acrylates are elastic. This may be attributed to the side groups extending from the long chain molecules. The polymer also has plastic flow and may be milled on conventional rubber milling rolls to sheet form and this condition has plastic flow characteristics suiting it to be molded in accordance with the conventional rubber technique. During the milling pigments, modifiers, catalysts or other material may be included.

In accordance with the invention a cross linking compound is mixed with the polymer. This may be done at any time or in any way but for convenience it is preferred to mix it during the milling operation in a manner similar to that now practiced in the rubber industry. If ethylene glycol is used, the milled polymer and the ethylene glycol exist as a mere mixture and are capable of being molded in accordance with the conventional rubber technique.

If desired a small amount, i. e., 0.01% to 5% and preferably 0.1% to 2% of a material may be added to facilitate the reaction. The amount will depend on the thoroughness of mixing, the rate of the particular reaction involved, and the curing temperature used. A mineral acid, alkali, zinc chloride, aluminum chloride, sodamid, a lower organic acid chloride or any compound known to promote esterification or trans-esterification are desirable ingredients for this purpose.

Following or during the molding operation the mass is heated, whereupon trans-esterification or ester interchange occurs, and the plastic flow is eliminated. The chemistry involved is very complicated but it is speculated that the chains probably may be cross linked in the following manner:

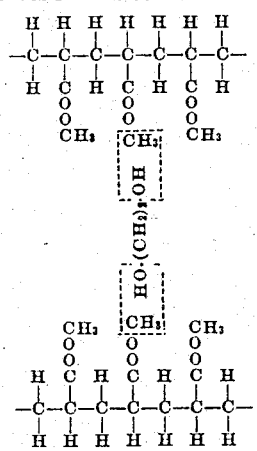

The relative proportions of the polymer and the coupling compound may be varied over wide ranges, depending upon the conditions of elasticity, strength, etc., desired in the final product. In general, it has been found that 1 to 10% of the coupling compound by weight may be used with a complementary percentage of the acrylate polymer. Ethylene glycol in the amount of 5% produces a particularly satisfactory product.

The properties of the final product may be controlled to some extent by the amount of the coupling compound. Thus if a large amount of the coupling compound is milled in, and such an amount is completely cross linked, a harder product would result approaching the properties of hard rubber. Even though a large amount of the coupling compound is present in admixture with the polymer, it may be possible to produce a softer and more elastic product by terminating the reaction short of complete coupling. In general, however, the amount of the cross linking compound should not greatly exceed that required for a product of the desired elasticity when completely cured.

After the product has been milled, it may be molded by any of the conventional molding techniques now applicable to the rubber industry. During or following the molding the composition is heated, whereupon the polymer and cross linking compound react to accomplish the trans-esterification. The temperature for this reaction may be anywhere from 100° to 200° C. but must be selected with reference to the boiling point of the cross linking compound and the boiling point of the compound formed during the reaction and whether the latter is to remain or be eliminated.

A temperature in the range of 130° to 150° C. has been found particularly satisfactory.

Referring more particularly to a specific example as illustrative of the method comprising my invention, 200 pounds of poly methyl acrylate polymer, 100 pounds of carbon black and 10 pounds of zinc oxide are milled on a conventional rubber mill. Into this mixture is milled 10 pounds of diethylene glycol and 10 pounds of sodamid. The milling is continued and the milling rolls are cooled so that any heat generated during the milling is dissipated and does not cause a reaction. When the materials are thoroughly milled, they are sheeted off the rolls in a conventional manner and may be molded to any desired shape. During or following the molding the product is heated to a temperature of about 140° C. for from 5 to 40 minutes. The material, after this treatment, is subjected to test with a durometer in much the same way that rubber tube stock is tested, and this showed no plastic flow.

The amounts of the pigments may be varied depending upon the uses to which the product is to be put and the amount of the cross linking compound may be varied within the limits mentioned above. Instead of sodamid, other reaction promoting materials may be used as mentioned heretofore. The amount of this reaction promoting material may be varied as indicated heretofore.

In a further example, a methyl acrylate polymer was milled with castor oil, following which zinc oxide and sodamid were milled in. This material was tested with a durometer and showed a typical uncured action both as to hardness and plastic flow. This material was cured for about ten minutes at about 140° C. When this was tested with a durometer it showed no plastic flow and was fully cured. In this example it is likely that the hydroxy groups of the ricinoleate radical act in the trans-esterifying action.

In a further example hydrated lime is milled with the alkyl acrylate polymer and the cross linkage is thought to be accomplished during curing by saponification and the formation of the alkyl alcohol.

In still a further example a di-ester such as glycol dichloride or glycol diacetate is milled with the alkyl acrylate polymer and cured; the alkyl chloride and alkyl acetate are formed respectively.

In selecting the compounds for the reaction consideration should be given to the boiling point of the product formed in the reaction and the relation of the curing temperature. If it is desired that the product remain, its boiling point should be above the curing temperature. In fact it is possible to form products during the curing which have a plasticizing or elasticizing action.

While the invention has been described particularly with reference to the use of certain compounds, it will be understood that any other di-type compound may be used, such as those mentioned heretofore. In selecting the compound consideration should be given of course, to the reactivity thereof with the polymer and the temperatures at which the various operations are preferred to be carried out.

It will be obvious that many materials and procedures may be possible in accordance with the invention described herein other than the specific illustrative examples and all of the same that fall within the following claims are intended to be included.

We claim:

1. The method of forming an alkyl acrylate polymer into an elastic substance having properties similar to those of vulcanized natural rubber, which comprises milling hydrated lime into an alkyl acrylate polymer while it is in a plastic condition, molding the milled plastic mixture, and then heating the molded mixture, the amount of said hydrated lime milled into the polymer and the extent of heating being such as to eliminate plastic flow characteristics from the composition and to provide the above mentioned elastic properties.

2. The method of forming a methyl acrylate polymer into an elastic substance having properties similar to those of vulcanized natural rubber, which comprises milling hydrated lime into a methyl acrylate polymer while it is in a plastic condition, molding the milled plastic mixture, and then heating the molded mixture, the amount of said hydrated lime milled into the polymer and the extent of heating being such as to eliminate plastic flow characteristics from the composition and to provide the above mentioned elastic properties.

FRANCIS CLARKE ATWOOD.
HENRY A. HILL.